United States Patent [19]

Farries et al.

[11] Patent Number: 5,084,881
[45] Date of Patent: Jan. 28, 1992

[54] GLASS LASER

[75] Inventors: Mark C. Farries, Northampton; Paul R. Morkel, Southampton; Janet E. Townsend, Hamble, all of Great Britain

[73] Assignee: Amoco Corporation, Chicago, Ill.

[21] Appl. No.: 582,948

[22] PCT Filed: Apr. 12, 1989

[86] PCT No.: PCT/GB89/00375
§ 371 Date: Oct. 11, 1990
§ 102(e) Date: Oct. 11, 1990

[87] PCT Pub. No.: WO89/10019
PCT Pub. Date: Oct. 19, 1989

[30] Foreign Application Priority Data

Apr. 13, 1988 [GB] United Kingdom ............. 8808762

[51] Int. Cl.⁵ ....................... H01S 3/06; H01S 3/17
[52] U.S. Cl. ........................................ 372/6; 372/40
[58] Field of Search ..................... 372/40, 39, 6, 41

[56] References Cited

U.S. PATENT DOCUMENTS 3,729,690  4/1973  Snitzer ....................... 372/40
4,825,444  4/1989  Johna et al. ................. 372/41

FOREIGN PATENT DOCUMENTS 2601868  9/1976  Fed. Rep. of Germany.
01246    2/1987  PCT Int'l Appl.

OTHER PUBLICATIONS

Kazakov et al., "Induced Emission of $Sm^{3+}$ ions in the Visible Region of the Spectrum", *Opt. Spectrosc.* (USSR), 47(6), Dec. 1979, pp. 676-677.

T. T. Basieu et al., "Selective Laser Excitation of the Luminescence of $Sm^{3+}$ ions in Lanthanum Aluminum Silicate Glass", *Opt. Spectrosc.* (USSR) 46(5) May 1979, pp. 510-512.

*Primary Examiner*—James W. Davie
*Attorney, Agent, or Firm*—James A. Gabala; William H. Magidson; Ralph C. Medhurst

[57] ABSTRACT

A laser is characterized by a glass gain medium which contains trivalent samarium $Sm^{3+}$ ions and which, when optically pumped on one or a number of absorption bands to achieve excitation at or above the metastable $^4G_{5/2}$ level, radiates light at a wavelength substantially corresponding to transitions from the $^4G_{5/2}$ level of samarium.

9 Claims, 3 Drawing Sheets

GLASS LASER

TECHNICAL FIELD

The present invention relates to the general subject of glass lasers, and, in particular to an apparatus for producing visible lasing emission from a rare earth doped optical fibre.

BACKGROUND OF THE INVENTION

Glass lasers were invented in 1961 (Snitzer E., "Optical Maser Action of $Nd^{3+}$ in a Barium Crown Glass," *Phys Rev.*, 1961, 7, p 444) and are now widely used. Glass lasers are advantageous because they have high gain, long fluorescence life times and can be simply made in a variety of geometries.

There is a reported observation of visible laser action from a samarium doped crystal (Kazakov B. N., Orlov M. S., Petrov M. V., Stolov A. L., Tkachuk A. M.; "Induced Emission of $Sm^{3+}$ Ions in the Visible Region," *Opt. Spectrosc* (USSR) 1979, 47, p 676-677). However, laser emission due to the $^4G_{5/2}$ to $^6H_{9/2}$ transition in $Sm^{3+}$ ions has not previously been observed in any material, particularly glass.

SUMMARY OF THE INVENTION

The glass laser of the invention is characterised by a glass gain medium which contains trivalent samarium $Sm^{3+}$ ions and which, when optically pumped on one or a number of absorption bands to achieve excitation to the metastable $^4G_{5/2}$ level, radiates light at a wavelength substantially corresponding to transitions from the $^4G_{5/2}$ level of samarium.

The laser of the invention is a glass laser which is capable of producing visible red light, as well as yellow, orange and infrared light. According to a preferred embodiment of the invention, the glass gain medium is an optical fibre waveguide containing $Sm^{3+}$ ions in its core, the cladding, or both.

BRIEF DESCRIPTION OF THE DRAWINGS

An embodiment of the invention will now be described in detail, by way of example, with reference to the drawings, in which.

DESCRIPTION OF THE PREFERRED EMBODIMENT

Figure 1A:
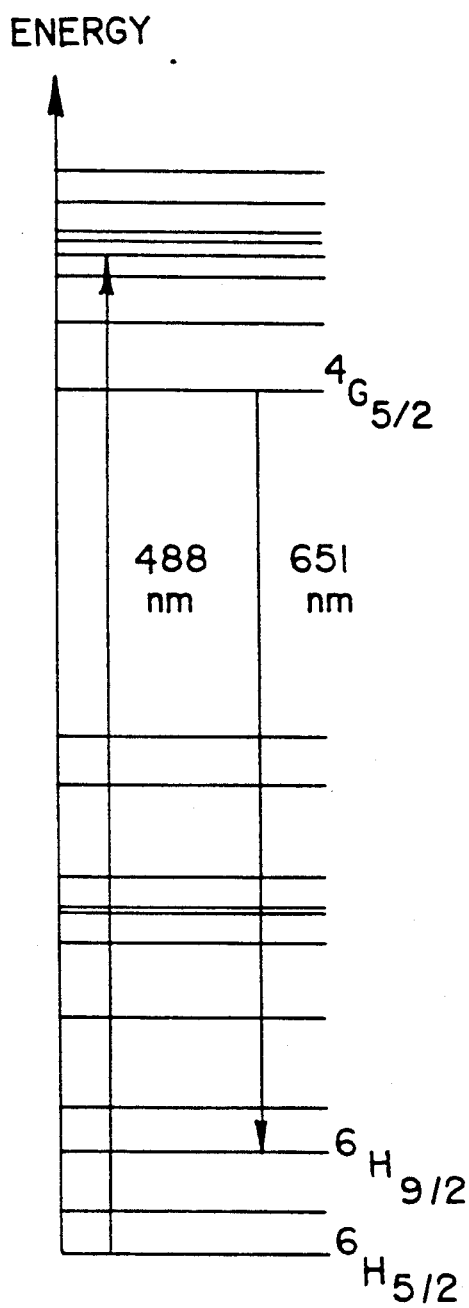
FIG. 1(a) is an energy level diagram.
Figure 1B:
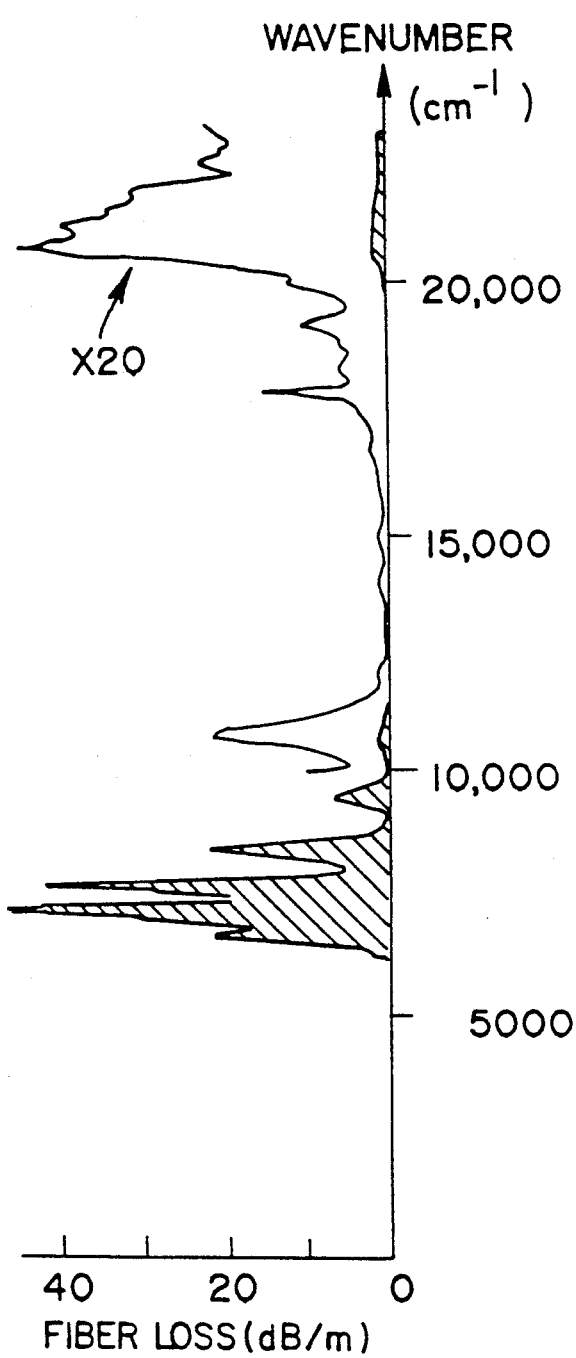
FIG. 1(b) is an absorption spectrum for samarium-doped silica.
Figure 2:
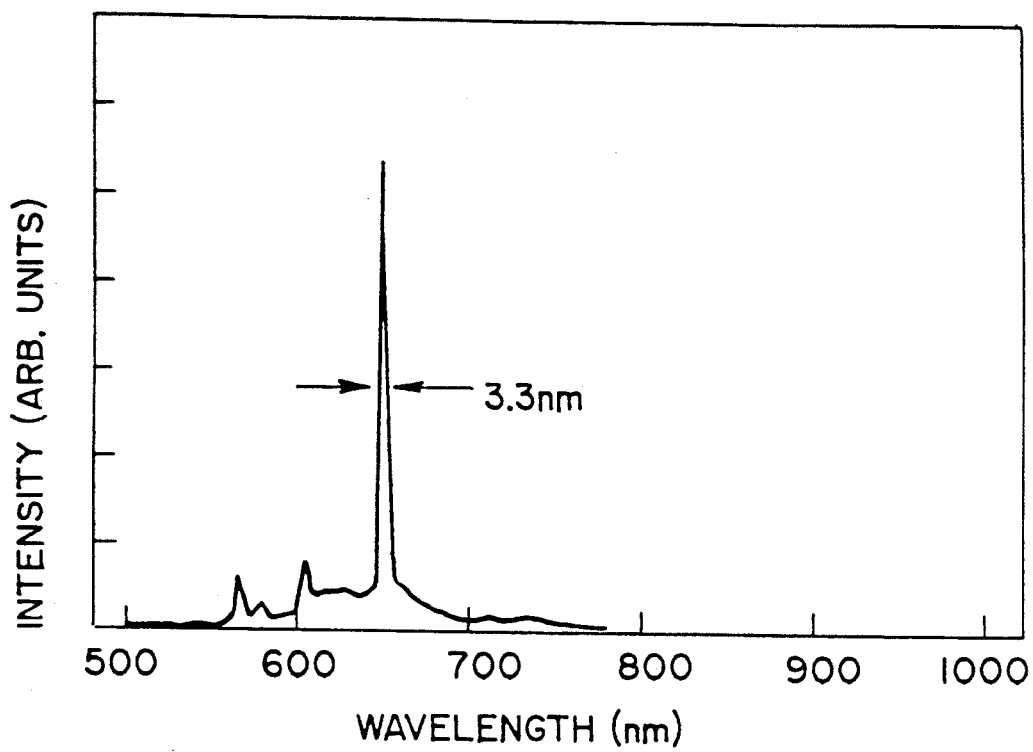
FIG. 2 shows the fluorescence spectrum of silica glass doped with $Sm^{3+}$ ions.

The optical properties of silica doped with $Sm^{3+}$ ions are illustrated by the energy level diagram of FIG. 1(a) and by the absorption spectrum of FIG. 1(b). Samarium $Sm^{3+}$ doped silica has been found to be a particularly attractive lasing medium by virtue of the long meta-stable life-time combined with the high branching ratio and narrow line-width (3.3 nm) of the radiative transition (see FIG. 2). These properties are more usually a characteristic of rare-earth ions in crystals rather than an amorphous glass host.

Figure 3:
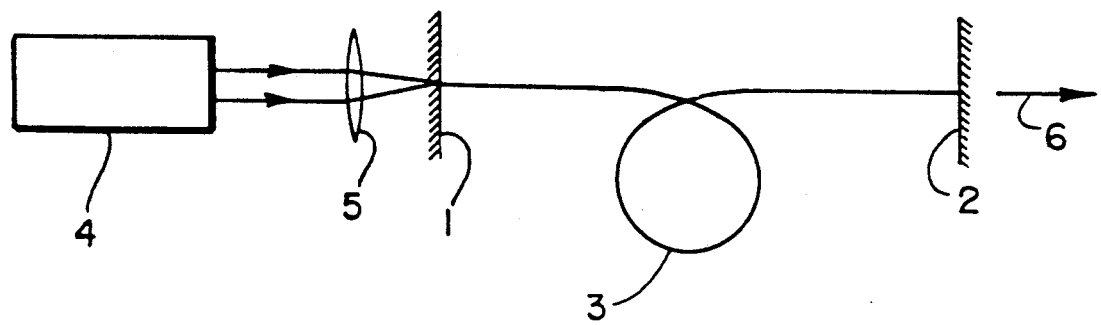
FIG. 3 is a schematic diagram of a Fabry-Perot resonator forming the basis for an operative glass laser.

An operative glass laser based on a Fabry-Perot resonator is shown in FIG. 3. Dielectric mirrors 1 and 2 have reflectances at the laser wavelength of 651 nm of 99% and 60% respectively. Both mirrors have reflectances less than 10% at the pump wavelenght 488 nm. A samarium-doped fibre 3 is cleaved and butted up to the mirrors. The mirrors 1 and 2 provide optical feedback at the lasing wavelength and the fibre provides the gain medium.

Preferably, a waveguide confines the optical field to a high intensity region which results in a lower threshold for laser action. Recent work (Mears R. J., Reekie L., Poole S. B., Payne D. N.; "Neodymium-doped silica single mode fibre lasers," *Electron. Lett.*, 1986, 21, pp 738-740) has produced a single mode glass fibre laser with a threshold below 1 mW. Preferably, therefore, the glass laser of the invention is made from single mode silica fibre doped with samarium.

In particular, a silica optical fibre preform, containing more than 80 mole % silica ($SiO_2$), is doped with 250 molar ppm of $Sm^{3+}$ ions using a solution doping process (Stone, Burrus; "Nd-doped $SiO_2$ Lasers in End Pumped Fibre Geometry," *Appl Phys Lett.*, 23, pp 388-389). The preform is pulled into an optical fibre with a numerical aperture of 0.18 and a single mode cut off wavelength of 620 nm using well-known technology.

A fibre doped with approximately 250 ppm $Sm^{3+}$ ions has large absorption (1000 dB/km) at a pump wavelength of 488 nm, which corresponds to a transition from the $^6H_{5/2}$ ground state to the $^4I_{9/2}$ level. Other wavelengths may be used to pump the laser to levels above the meta-stable $^4G_{5/2}$ level. Referring to FIG. 1(b), the absorption band centered at 564 nm has a line width of only 2.2 nm, which is narrower than the linewidth of any other trivalent rare-earths in silica.

Referring to FIG. 1(a), the atoms decay down to the meta-stable level which has a fluorescence lifetime of 1.68 ms. Stimulated emission of 651 nm light occurs between the meta-stable level and the $^6H_{9/2}$ level. This is a four level laser transition. Laser action may also occur from the meta-stable level to the other $^6H$ levels, although these should be less efficient than the main transition. The fibre has a low loss (50 dB/km) at the lasing wavelength.

Optical pumping is achieved by coupling in up to 1 W of optical power at 488 nm from an argon-ion laser 4 using a microscope objective 5. Red laser light 6 is emitted from the output mirror 2 when threshold is reached at 20 mW of pump power.

Figure 4:
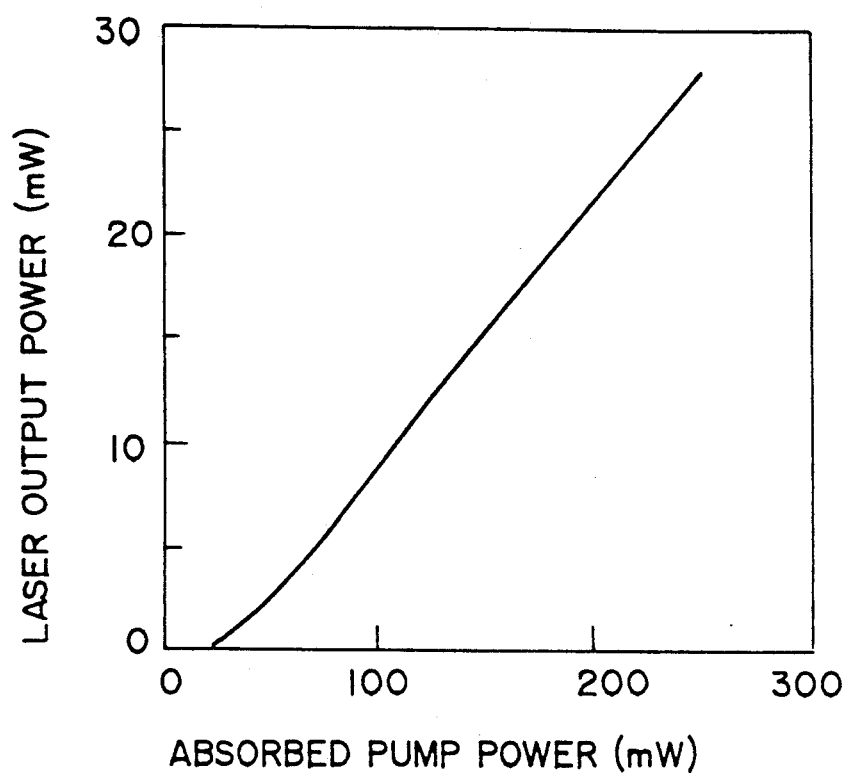
FIG. 4 shows the lasing characteristics of a glass laser based on the resonator of FIG. 3.

The lasing characteristic of the fibre laser of FIG. 3 is shown in FIG. 4. Fibre losses reduce the slope efficiency of the device to 12%. The threshold is reduced to 2.3 mW by increasing the reflectivity of the output mirror 2 to 93%.

Figure 5:
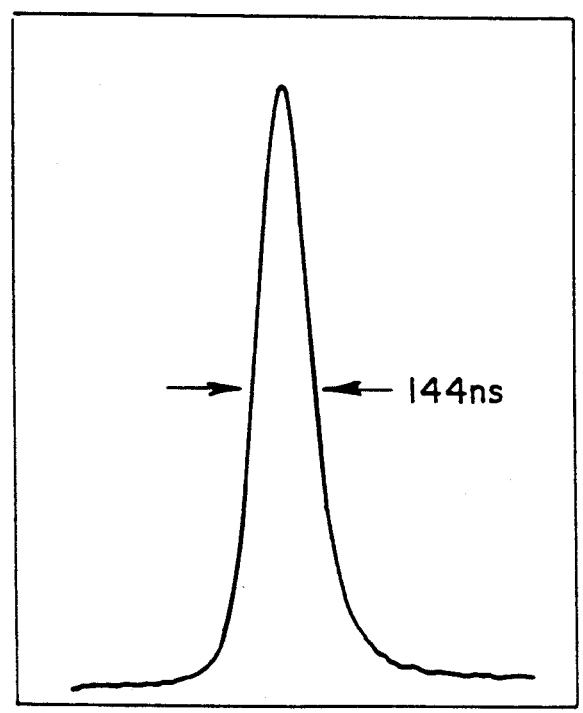
FIG. 5 shows an oscilloscope trace of a Q-switched pulse from the laser of FIG. 3.

From the foregoing description, it will be observed that numerous variations, alternatives and modifications will be apparent to those skilled in the art. Accordingly, this description is to be construed as illustrative only and is for the purpose of teaching those skilled in the art the manner of carrying out the invention. Various changes may be made, materials substituted and features of the invention utilized. For example, pulse Q-switched operation of the laser can be achieved by inserting a lens and a rotating chopper into the laser cavity (See FIG. 3). The loss of the cavity is modulated with the chopper wheel or another type of modulator. In this way pulses of peak power 8 W and width 144 ns have been achieved (See FIG. 5). It would also be possible to modulate the cavity loss at a frequency corresponding to the cavity round trip rate. This would produce short mode-locked pulses. Thus, it will be appreciated that various modifications, alternatives, variations, etc., may be made without departing from the spirit and scope of the invention as defined in the appended claims. It is, of course, intended to cover by the appended claims all such modifications involved within the scope of the claims.

We claim:

1. A glass laser characterised by a gain medium which contains trivalent samarium $Sm^{3+}$ ions, and which when optically pumped on one or a number of absorption bands to achieve excitation to the metastable $^4G_{5/2}$ level, radiates lasing light at a wavelength substantially corresponding to transitions from the $^4G_{5/2}$ level of samarium.

2. A laser as claimed in claim 1 wherein the glass gain medium contains more than 80 mol % silica ($SiO_2$) and is an optical fibre waveguide having a core and cladding and containing $Sm^{3+}$ ions in at least one of said core and said cladding.

3. A laser as claimed in claim 2, wherein the optical fibre waveguide is a single-mode design which lases at a wavelength of 651 nm.

4. A laser according to claim 2 in which the glass gain medium is doped with $Sm^{3+}$ ions using the solution doping technique and is adapted to be optically pumped with light having a wavelength of about 488 nm.

5. A laser according to claim 2, wherein said laser emits visible radiation having a line width of about 3.3 nm.

6. A glass laser, comprising: a gain medium formed from a glass optical fiber waveguide having an interior core and exterior cladding, having trivalent samarium $Sm^{3+}$ ions solution doped into at least one of said core and cladding, having a core which contains more than 80 mol % silica ($SiO_2$), and having at least one absorption band which when optically pumped achieves excitation to the metastable $^4G_{5/2}$ level and radiates lasing light at a wavelength substantially corresponding to transitions from the $^4G_{5/2}$ level to the $^6H_{9/2}$ level of samarium.

7. The glass laser of claim 6, wherein said glass optical fiber waveguide is a single-mode optical fiber which lases at a wavelength of about 651 nm.

8. The glass laser of claim 6, further including means for optically pumping said glass fiber at about 480 nm; and means for forming a Fabry-Perot resonator from two opposite dielectric mirrors whose reflectances at a wavelength of about 650 nm are in excess of 60% and whose reflectances at about 488 nm are less than about 10%, said fiber being cleaved and butted up to said mirrors.

9. A glass laser, comprising: a gain medium formed from a single-mode optical fiber having a glass core which contains at least 80 mol % silica and which is doped with trivalent samarium $Sm^{3+}$ ions using the solution doping technique and which has at least one absorption band to achieve excitation to the metastable $^4G_{5/2}$ level, said fiber when optically pumped to said $^4G_{5/2}$ level radiating light having a wavelength substantially corresponding to transitions from the $^4G_{5/2}$ level to the $^6H_{5/2}$ level of samarium, and having a line where width of about 3.3 nm.

* * * * *

UNITED STATES PATENT AND TRADEMARK OFFICE
CERTIFICATE OF CORRECTION

PATENT NO. : 5,084,881
DATED : January 28, 1992
INVENTOR(S) : Mark C. Farries, Paul R. Marcel, and Janet E. Townsend It is certified that error appears in the above-identified patent and that said Letters Patent is hereby corrected as shown below:

| Col. | Line | |
|---|---|---|
| 4 | 35 | "to the $^6H_{5/2}$ level of samarium." should read --to the $^6H_{9/2}$ level of samarium,-- |

Signed and Sealed this

First Day of June, 1993

Attest:

MICHAEL K. KIRK

Attesting Officer     Acting Commissioner of Patents and Trademarks